US012248275B2

(12) United States Patent
Tsurumi et al.

(10) Patent No.: US 12,248,275 B2
(45) Date of Patent: Mar. 11, 2025

(54) ELECTROSTATIC CHARGE IMAGE DEVELOPING TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Yosuke Tsurumi, Kanagawa (JP); Yasuaki Hashimoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 560 days.

(21) Appl. No.: 17/666,486

(22) Filed: Feb. 7, 2022

(65) Prior Publication Data

US 2023/0101891 A1 Mar. 30, 2023

(30) Foreign Application Priority Data

Sep. 24, 2021 (JP) ................................ 2021-156190

(51) Int. Cl.

*G03G 9/08* (2006.01)
*G03G 9/097* (2006.01)
*G03G 15/08* (2006.01)

(52) U.S. Cl.

CPC ......... *G03G 9/0819* (2013.01); *G03G 9/0825* (2013.01); *G03G 9/0827* (2013.01); *G03G 9/09708* (2013.01); *G03G 9/09783* (2013.01); *G03G 15/0865* (2013.01)

(58) Field of Classification Search

CPC .. G03G 9/0819; G03G 9/0825; G03G 9/0827; G03G 9/09708; G03G 9/09783; G03G 15/0865

See application file for complete search history.

(56) References Cited

U.S. PATENT DOCUMENTS

| | | | | |
|---|---|---|---|---|
| 7,135,263 | B2 | 11/2006 | Kawakami et al. | |
| 11,131,939 | B2 | 9/2021 | Hama et al. | |
| 2005/0058926 | A1* | 3/2005 | Kawakami | G03G 9/09716 430/108.7 |
| 2014/0072910 | A1* | 3/2014 | Iwatsuki | G03G 9/1137 430/111.1 |
| 2019/0033739 | A1* | 1/2019 | Yamagishi | G03G 9/09716 |

FOREIGN PATENT DOCUMENTS

| | | |
|---|---|---|
| JP | 2005338750 | 12/2005 |
| JP | 2020034651 | 3/2020 |

* cited by examiner

*Primary Examiner* — Stewart A Fraser
(74) *Attorney, Agent, or Firm* — JCIPRNET

(57) ABSTRACT

An electrostatic charge image developing toner includes toner particles, and an external additive that contains particles A containing a perovskite-type compound and having an equivalent circle diameter of 15 nm or greater and 90 nm or less and particles B containing a perovskite-type compound and having an equivalent circle diameter of 1.0 μm or greater and 3.0 μm or less, in which the particles B occupy 0.3% by number or greater and 3.5% by number or less of an entirety of the toner particles.

10 Claims, 2 Drawing Sheets

ELECTROSTATIC CHARGE IMAGE DEVELOPING TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-156190 filed Sep. 24, 2021.

BACKGROUND

(i) Technical Field

The present invention relates to an electrostatic charge image developing toner, an electrostatic charge image developer, and a toner cartridge.

(ii) Related Art

JP2020-34651A suggests "a toner that contains toner particles containing a binder resin and inorganic fine particles, in which the inorganic fine particles include aggregated particles, the aggregated particles include primary particles of at least one metal salt selected from the group consisting of a titanium acid metal salt and a zirconic acid metal salt, the number average particle diameter of the primary particles of the metal salt is in a range of 15 nm to 55 nm, the aggregate diameter of the aggregated particles is in a range of 80 nm to 300 nm, the volume resistivity of the aggregated particles is in a range of $2\times10^9$ Ω·cm to $2\times10^{13}$ Ω·cm, and the coverage of the aggregated particles on the surface of the toner particles is in a range of 0.3 area % to 10.0 area %".

JP2005-338750A suggests "a toner that contains at least toner particles containing at least a colorant and a binder resin, and inorganic fine powder, in which the inorganic fine powder has a primary particle average particle diameter of 30 to 300 nm and includes particles having a cubic particle shape and/or a rectangular parallelepiped particle shape and having perovskite-type crystals, and the content of particles having a particle diameter of 600 nm or greater and aggregates in the inorganic fine powder is 1% by number or less.

SUMMARY

Aspects of non-limiting embodiments of the present disclosure relate to an electrostatic charge image developing toner, an electrostatic charge image developer, and a toner cartridge that are capable of suppressing occurrence of image defects due to leakage of an electric charge from the electrostatic charge image developing toner as compared with an electrostatic charge image developing toner that contains toner particles and an external additive containing particles A that contain a perovskite-type compound and have an equivalent circle diameter of 15 nm or greater and 90 nm or less, in which the external additive contains particles B containing a perovskite-type compound and having an equivalent circle diameter of less than 1.0 μm or greater than 3.0 μm or the external additive contains particles B containing a perovskite-type compound and having an equivalent circle diameter of 1.0 μm or greater and 3.0 μm or less and the proportion of the particles B in the entirety of the toner particles is less than 0.3% by number or greater than 3.5% by number.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The above-described object is achieved by the following means.

According to an aspect of the present disclosure, there is provided an electrostatic charge image developing toner including toner particles, and an external additive that contains particles A containing a perovskite-type compound and having an equivalent circle diameter of 15 nm or greater and 90 nm or less and particles B containing a perovskite-type compound and having an equivalent circle diameter of 1.0 μm or greater and 3.0 μm or less, in which the particles B occupy 0.3% by number or greater and 3.5% by number or less of an entirety of the toner particles.

BRIEF DESCRIPTION OF THE DRAWINGS

Exemplary embodiment(s) of the present invention will be described in detail based on the following figures, wherein.

DETAILED DESCRIPTION

Figure 1:
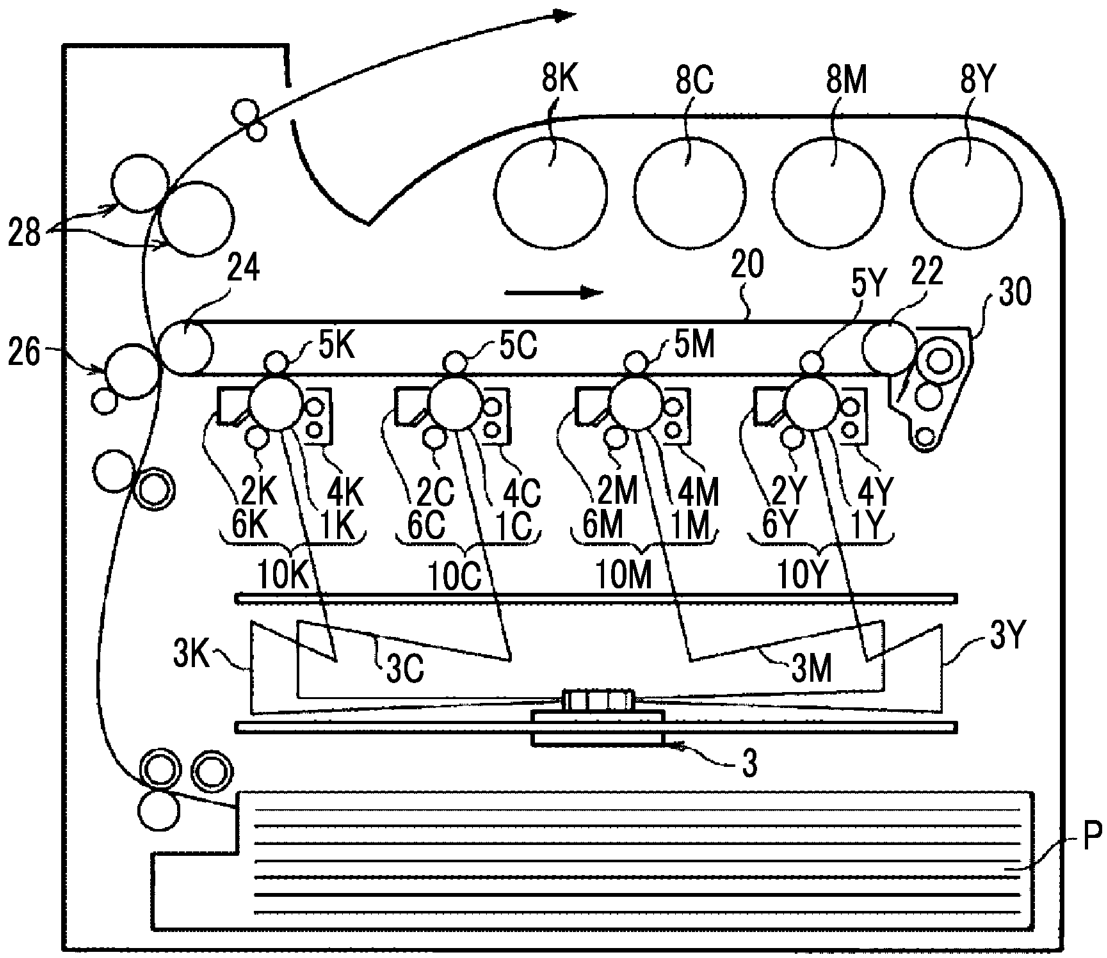
FIG. 1 is a schematic configuration view showing an image forming device according to the present exemplary embodiment.

Hereinafter, exemplary embodiments that are examples of the present invention will be described. The following descriptions and examples merely illustrate the exemplary embodiments, and do not limit the scope of the exemplary embodiments.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

Each component may include a plurality of kinds of substances corresponding to each component.

In a case where a plurality of kinds of substances corresponding to each component in a composition are present, the amount of each component in the composition indicates the total amount of the plurality of kinds of substances present in the composition unless otherwise specified.

Electrostatic Charge Image Developing Toner

An electrostatic charge image developing toner according to the present exemplary embodiment (hereinafter, also simply referred to as the "toner") includes toner particles, and an external additive that contains particles A containing a perovskite-type compound and having an equivalent circle diameter of 15 nm or greater and 90 nm or less and particles B containing a perovskite-type compound and having an equivalent circle diameter of 1.0 μm or greater and 3.0 μm or less, in which the particles B occupy 0.3% by number or greater and 3.5% by number or less of the entirety of the toner particles.

With the above-described configuration, the toner according to the present exemplary embodiment suppresses occurrence of image defects due to leakage of an electric charge from the electrostatic charge image developing toner. The reason for this is assumed as follows.

A toner in which particles having a high dielectric constant and a low resistance (for example, particles containing a perovskite-type compound) are externally added to toner particles tends to have a high charging rate and a high electric charge when charged. However, the toner may cause leakage of an electric charge (electric charge leakage) to an image holding member (for example, a photoreceptor, the same applies hereinafter), a carrier, and the like due to the high dielectric constant of the particles to be externally added. The electric charge leakage from the toner may cause image defects such as scattering of the toner to an image to be obtained, image omission, and the like.

The toner according to the present exemplary embodiment contains a perovskite-type compound and particles A having an equivalent circle diameter of 15 nm or greater and 90 nm or less. In this manner, the toner has a high charging rate and a high electric charge when charged.

Further, the toner according to the present exemplary embodiment contains particles B containing a perovskite-type compound and having an equivalent circle diameter of 1.0 μm or greater and 3.0 μm or less. The electric charge leakage of the toner to which the particles containing a perovskite-type compound are externally added is likely to occur in a case where the particles containing a perovskite-type compound come into contact with an image holding member, a carrier, or the like. The particles B have a larger particle diameter than the particles A and have a function of a spacer between an image holding member, a carrier, and the like. Therefore, the contact points between the particles containing perovskite-type compound (that is, the particles A and the particles B) and the image holding member, the carrier, and the like can be reduced. Therefore, the toner according to the present exemplary embodiment suppresses electric charge leakage from the toner. Further, since the particles B occupy 0.3% by number or greater and 3.5% by number or less of the entirety of the toner particles, the contact points between the image holding member and the like and the particles containing a perovskite-type compound (that is, the particles A and the particles B) are reduced, and thus the electric charge leakage from the toner is further suppressed.

As described above, it is assumed that the toner according to the present exemplary embodiment suppresses occurrence of image defects due to the leakage of an electric charge from the electrostatic charge image developing toner with the above-described configuration.

Toner Particles

The toner particles contain, for example, a binder resin, and a colorant, a release agent, and other additives as necessary.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

Such binder resins may be used alone or in combination of two or more kinds thereof.

As the binder resin, for example, a polyester resin is preferable.

Examples of the polyester resin include known polyester resins.

Examples of the polyester resin include a condensed polymer of a polyvalent carboxylic acid and a polyhydric alcohol. As the polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among the examples, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A), and an aromatic diol (such as an ethylene oxide adduct of bisphenol A or a propylene oxide adduct of bisphenol A). Among the examples, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The glass transition temperature (Tg) of the polyester resin is, for example, preferably 50° C. or higher and 80° C. or lower and more preferably 50° C. or higher and 65° C. or lower.

Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average-molecular weight (Mw) of the polyester resin is, for example, preferably 5000 or greater and 1000000 or less and more preferably 7000 or greater and 500000 or less.

The number average molecular weight (Mn) of the polyester resin is, for example, preferably 2000 or greater and 100000 or less.

The molecular weight distribution Mw/Mn of the polyester resin is, for example, preferably 1.5 or greater and 100 or less and more preferably 2 or greater and 60 or less.

Further, the weight-average molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average molecular weight and the number average molecular weight are calculated using a molecular weight calibration curve created by a monodisperse polystyrene standard sample based on the measurement results.

The polyester resin is obtained by a known production method. Specifically, for example, the polyester resin is obtained by a method of setting the polymerization temperature to 180° C. or higher and 230° C. or lower, reducing the pressure inside the reaction system as necessary, and carrying out the reaction while removing water and alcohol generated during condensation.

In a case where the raw material monomer is not dissolved or compatible at the reaction temperature, a solvent having a high boiling point may be added as a dissolution assistant to dissolve the monomer. In this case, the polycondensation reaction is carried out while the dissolution assistant is distilled off. In a case where a monomer with poor compatibility is present, for example, the monomer with poor compatibility may be condensed with an acid or an alcohol to be polycondensed with the monomer in advance, and then polycondensed with the main component.

The content of the binder resin is, for example, preferably 40% by mass or greater and 95% by mass or less, more preferably 50% by mass or greater and 90% by mass or less, and still more preferably 60% by mass or greater and 85% by mass or less with respect to the entirety of the toner particles.

Colorant

Examples of other colorants include various pigments such as Carbon Black, Chrome Yellow, Hansa Yellow, Benzidine Yellow, Suren Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, Dupont Oil Red, Pyrazolon Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate, and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

The colorants may be used alone or in combination of two or more kinds thereof.

As the colorant, a surface-treated colorant may be used as necessary, or a combination with a dispersant may be used. Further, a plurality of kinds of colorants may be used in combination.

The content of the colorant is, for example, preferably 1% by mass or greater and 30% by mass or less and more preferably 3% by mass or greater and 15% by mass or less with respect to the entirety of the toner particles.

Release Agent

Examples of the release agent include hydrocarbon-based wax, natural wax such as carnauba wax, rice wax, or candelilla wax, synthetic or mineral/petroleum wax such as montan wax, and ester-based wax such as fatty acid ester or montanic acid ester. The release agent is not limited thereto.

The melting temperature of the release agent is, for example, preferably 50° C. or higher and 110° C. or lower and more preferably 60° C. or higher and 100° C. or lower.

Further, the melting temperature is acquired from the DSC curve obtained by differential scanning calorimetry (DSC) according to the "melting peak temperature" described in the method of acquiring the melting temperature in JIS K 7121-1987 "Method of measuring transition temperature of plastics".

The content of the release agent is, for example, preferably 1% by mass or greater and 20% by mass or less and more preferably 5% by mass or greater and 15% by mass or less with respect to the entirety of the toner particles.

Other Additives

Examples of other additives include known additives such as a magnetic material, a charge control agent, and inorganic powder. Such additives are contained in the toner particles as internal additives.

Characteristics of Toner Particles and the Like

The toner particles may be toner particles having a single layer structure or toner particles having a so-called core-shell structure formed of a core portion (core particle) and a coating layer (shell layer) covering the core portion.

Here, the toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or greater and 10 μm or less and more preferably 4 μm or greater and 8 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5% aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. Further, the number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter) [(perimeter of circle having same projected area as particle image)/(perimeter of projected particle image)].

Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

Further, in a case where the toner has an external additive, the toner (developer) to be measured is dispersed in water containing a surfactant, and an ultrasonic treatment is performed, thereby obtaining toner particles from which the external additive has been removed.

External Additive

The external additive contains particles A containing a perovskite-type compound and having an equivalent circle diameter of 15 nm or greater and 90 nm or less, and particles B containing a perovskite-type compound having an equivalent circle diameter of 1.0 μm or greater and 3.0 μm or less.

In the present exemplary embodiment, the perovskite-type compound is a compound having a perovskite structure, which is a kind of crystal structure. Examples of the perovskite-type compound include strontium titanate, barium titanate, calcium titanate, strontium zirconate, barium zirconate, and calcium zirconate. Among the examples, at least one selected from the group consisting of strontium titanate, barium titanate, and calcium titanate is preferable.

Particle A

The particles A are particles containing a perovskite-type compound and having an equivalent circle diameter of 15 nm or greater and 90 nm or less.

From the viewpoint of suppressing the occurrence of image defects due to the leakage of an electric charge from the electrostatic charge image developing toner, the equivalent circle diameter of the particles A is, for example, preferably 20 nm or greater and 85 nm or less, more preferably 25 nm or greater and 80 nm or less, and still more preferably 30 nm or greater and 75 nm or less.

The equivalent circle diameter of the particles A is calculated by observing photographs of 100 particles A with a SEM device and calculating the average value of the equivalent circle diameters acquired from the following equation using image analysis software WinROOF (manufactured by Mitani Corporation).

$$\text{Equation: equivalent circle diameter} = 2\sqrt{(\text{area}/\pi)}$$

[In the above-described equation, the area indicates the projected area of the particles A.]

The surface of the particle A may be subjected to a hydrophobic treatment. Examples of a hydrophobic treatment agent include known surface treatment agents, and specific examples thereof include a silane coupling agent and silicone oil.

Examples of the silane coupling agent include hexamethyldisilazane, trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, and vinyltriacetoxysilane.

Examples of the silicone oil include dimethylpolysiloxane, methylhydrozinepolysiloxane, and methylphenylpolysiloxane.

The content of the particles A is, for example, preferably 0.01% by mass or greater and 5% by mass or less and more preferably 0.01% by mass or greater and 2.0% by mass or less with respect to the toner particles.

Particle B

The particles B are particles containing a perovskite-type compound and having an equivalent circle diameter of 1.0 μm or greater and 3.0 μm or less.

From the viewpoint of suppressing the occurrence of image defects due to the leakage of an electric charge from the electrostatic charge image developing toner, the equivalent circle diameter of the particles B is, for example, preferably 1.2 μm or greater and 2.8 μm or less, more preferably 1.4 μm or greater and 2.6 μm or less, and still more preferably 1.6 μm or greater and 2.4 μm or less.

The measurement of the equivalent circle diameter of the particles B is performed in the same manner as the measurement of the equivalent circle diameter of the particles A.

The particles B occupy 0.3% by number or greater and 3.5% by number or less of the entirety of the toner particles.

From the viewpoint of suppressing the occurrence of image defects due to the leakage of an electric charge from the electrostatic charge image developing toner, for example, the particles B occupy preferably 0.5% by number or greater and 3.3% by number or less, more preferable 0.7% by number or greater and 3.1% by number or less, and still more preferably 0.9% by number or greater and 2.9% by number or less with respect to the entirety of the toner particles.

The proportion (% by number) of the particles B in the entirety of the toner particles is calculated by observing the toner with a scanning electron microscope (SEM) device. First, the magnification is adjusted such that 100 toner particles are included in a SEM image. Further, the number of particles B included in the SEM image is counted, and the number of particles B is calculated as the proportion (% by number) of the particles B in the entirety of the toner particles.

The particle B may be primary particles, aggregates including a plurality of primary particles, or mixed particles of primary particles and aggregates including a plurality of primary particles.

From the viewpoint of suppressing the occurrence of image defects due to the leakage of an electric charge from the electrostatic charge image developing toner, for example, it is preferable that the particles B are aggregates including a plurality of primary particles.

In a case where the particles B are aggregates including a plurality of primary particles, the surface of each particle B is likely to be uneven, and thus the contact area between the image holding member or the carrier and the toner is likely to decrease as compared to a case where the particles B are primary particles. Therefore, it is assumed that the leakage of an electric charge from the toner is further suppressed and thus the occurrence of image defects due to the electric charge leakage from the electrostatic charge image developing toner is suppressed.

In a case where the particles B are, for example, aggregates including a plurality of primary particles, it is preferable that the aggregate include 10 or more primary particles.

Further, in a case where the particles B are, for example, aggregates including a plurality of primary particles, the aggregates including 10 or more primary particles occupy preferably 80% by number or greater, more preferably 85% by number or greater and 100% by number or less, still more preferably 87% by number or greater and 98% by number or less, and most preferably 90% by number or greater and 95% by number or less of the entirety of the aggregates.

By setting the proportion of the aggregates including 10 or more primary particles in the entirety of the aggregates to be in the above-described range, the proportion of the particles B having a surface with unevenness is increased. Therefore, the contact area between the image holding member or the carrier and the toner is likely to be further reduced. Therefore, it is assumed that the electric charge leakage from the toner is further suppressed and thus the occurrence of image defects due to the electric charge leakage from the electrostatic charge image developing toner is further suppressed.

The percentage (% by number) of the aggregates including 10 or more primary particles with respect to the entirety of the aggregates is calculated as follows.

First, photographs of 100 aggregates are observed with a SEM device. Among the 100 aggregates observed in the photographs, the number of aggregates including 10 or more primary particles is calculated. Further, the number of aggregates including 10 or more primary particles among the 100 aggregates observed in the photographs is defined as the percentage (% by number) of the aggregates including 10 or more primary particles with respect to the entirety of the aggregates.

Here, the number of primary particles included in the aggregates is calculated as follows.

The same photograph as the photograph used for the calculation of "the percentage of the aggregates including 10 or more primary particles with respect to the entirety of the aggregates" described above is observed. Further, among the primary particles included in the aggregates to be measured, the number of primary particles shown in the photograph is calculated. Further, the number twice the calculated number of primary particles is defined as the number of primary particles included in the aggregates to be measured.

In a case where the particles B are, for example, mixed particles of primary particles and aggregates including a plurality of primary particles, the proportion of the aggregates is preferably 80% by number or greater and 99% by number or less, more preferably 83% by number or greater and 97% by number or less, and still more preferably 85% by number or greater and 95% by number or less with respect to the entirety of the particles B.

The percentage (% by number) of the aggregates with respect to the entirety of the particles B is calculated as follows.

First, photographs of 100 particles B are randomly observed with a SEM device. Among the 100 particles B observed in the photographs, the number of aggregates is calculated. Further, the number of aggregates among the 100 particles B observed in the photographs is defined as the percentage (% by number) of the aggregates with respect to the entirety of the particles B.

Here, the primary particles and the aggregates are determined in the following manner.

The same photograph as the photograph used for the calculation of "the percentage of the aggregates with respect to the entirety of the particles B" described above is observed. Further, among the primary particles included in the particles B to be measured, the number of primary particles shown in the photograph is calculated. In a case where the calculated number of primary particles is one, the particle is regarded as the primary particle. Further, in a case where the calculated number of primary particles is two or more, the particles are regarded as an aggregate.

The equivalent circle diameter of the primary particles included in the aggregate is, for example, preferably 15 nm or greater and 1000 nm or less, more preferably 50 nm or greater and 1000 nm or less, and still more preferably 50 nm or greater and 500 nm or less.

Here, the equivalent circle diameter of the primary particles included in the aggregates is measured as follows.

The equivalent circle diameter of the primary particles is calculated by observing photographs of 100 primary particles included in the aggregates with a SEM device and calculating the average value of the equivalent circle diameters acquired from the following equation using image analysis software WinROOF (manufactured by Mitani Corporation).

Equation: equivalent circle diameter $=2\sqrt{(\text{area}/\pi)}$

[In the Above-Described Equation, the Area Indicates the Projected Area of the Particles B.]

The surface of the particle B may be subjected to a hydrophobic treatment. Examples of the hydrophobic treatment agent are the same as the hydrophobic treatment agents that may be used for the particles A.

The content of the particles B is, for example, preferably 0.5% by mass or greater and 5.0% by mass or less and more preferably 1.0% by mass or greater and 2.0% by mass or less with respect to the toner particles.

Dopant

For example, it is preferable that at least one of the particles A or the particles B are strontium titanate particles containing a dopant.

Here, in a case where the particles B are aggregates, for example, it is preferable that the aggregates are aggregates including strontium titanate particles as primary particles.

The strontium titanate particles containing a dopant tend to have a higher dielectric constant than the dielectric constant of strontium titanate particles containing no dopant. Therefore, in the case where at least one of the particles A or the particles B are strontium titanate particles containing a dopant, the toner is likely to have a higher charging rate and a higher electric charge when charged. In this manner, an image can be formed using the toner according to the present exemplary embodiment even under a high-temperature and high-humidity condition.

As described above, in the case where at least one of the particles A or the particles B are strontium titanate particles containing a dopant, the occurrence of image defects due to the leakage of an electric charge from the electrostatic charge image developing toner even under a high-temperature and high-humidity condition can be suppressed.

The dopant of the strontium titanate particles is not particularly limited as long as the dopant is a metal element other than titanium and strontium. For example, a metal element having an ionic radius that enables ions to enter a crystal structure constituting the strontium titanate particles when the metal is ionized is preferable. From this viewpoint, the dopant of the strontium titanate particles is, for example, preferably a metal element having an ionic radius of 40 μm or greater and 200 μm or less and more preferably a metal element having an ionic radius of 60 μm or greater and 150 μm or less, when ionized.

Specific examples of the dopant of the strontium titanate particles include lanthanoid, silica, aluminum, magnesium, calcium, barium, vanadium, chromium, manganese, iron, cobalt, nickel, copper, zinc, gallium, germanium, niobium, molybdenum, ruthenium, palladium, indium, antimony, tantalum, tungsten, rhenium, iridium, platinum, bismuth, yttrium, zirconium, niobium, silver, and tin. As the lanthanoid, for example, lanthanum or cerium is preferable. Among the examples, from the viewpoint that the ionic radius is a size that enables ions to enter the crystal structure constituting the strontium titanate particles and from the viewpoint of further improving the dielectric constant of the strontium titanate particles, for example, at least one of tantalum or lanthanum is preferable.

From the viewpoint of further improving the dielectric constant of the strontium titanate particles, the amount of the dopant in the strontium titanate particles is, for example, preferably in a range of 0.1% by mole or greater and 20% by mole or less, more preferably in a range of 0.1% by mole or greater and 15% by mole or less, and still more preferably in a range of 0.1% by mole or greater and 10% by mole or less with respect to the strontium.

Average Circularity of Particles a and Particles B

It is preferable that at least one of the particles A or the particles B have, for example, an average circularity of 0.82 or greater and 0.94 or less and a cumulative 84% circularity of greater than 0.92.

By setting the average circularity and the cumulative 84% circularity of at least one of the particles A or the particles B to be in the above-described ranges, the particles A and the particles B have an appropriately distorted shape. In this manner, at least one of the particles A or the particles B are more difficult to move on the toner particles. Further, since at least one of the particles A and B is not excessively distorted, it is difficult to be buried in the toner particles. Therefore, a state in which at least one of the particles A or the particles B are externally added onto the toner particles is likely to be maintained. Therefore, the occurrence of image defects due to the leakage of an electric charge from the electrostatic charge image developing toner can be suppressed.

From the viewpoint of further suppressing the occurrence of image defects due to the leakage of an electric charge from the electrostatic charge image developing toner, the average circularity of the particles A and the particles B is, for example, more preferably 0.84 or greater and 0.92 or less and still more preferably 0.86 or greater and 0.94 or less.

From the viewpoint of further suppressing the occurrence of image defects due to the leakage of an electric charge from the electrostatic charge image developing toner, the cumulative 84% circularity is, for example, more preferably 0.93 or greater and 0.99 or less and still more preferably 0.94 or greater and 0.98 or less.

Here, the average circularity and the cumulative 84% circularity of the particles A and the particles B are measured as follows.

The image information of 100 particles (the particles A or the particles B) to be measured is analyzed by the image processing analysis software WinRoof (Mitani Corporation) via an interface, the equivalent circle diameter, the area, and the perimeter of each primary particle image are acquired, and the equation of "circularity=$4\pi\times$(area)÷(perimeter)$^2$" is further acquired. Further, the cumulative 50% circularity from the small side in the distribution of circularity is defined as the average circularity, and the cumulative 84% circularity from the small side in the distribution of circularity is defined as the cumulative 84% circularity.

Ratio (Projected Area B/Projected Area T)

The ratio (projected area B/projected area T) of the projected area B of the particles B to the projected area T of the toner particles is, for example, preferably $0.5\times10^{-4}$ or greater and $20.0\times10^{-4}$ or less.

By setting the ratio (projected area B/projected area T) to be in the above-described numerical range, the occurrence of image defects due to the leakage of an electric charge from the electrostatic charge image developing toner is further suppressed.

The reason for this is assumed as follows.

It is assumed that in a case where the area ratio is in the above-described range, the contact charging between the toner and the carrier is not hindered, and the contact between the leak points of the toner and the carrier is not increased.

The projected area T of the toner particles and the projected area B of the particles B are measured by taking an optical microscope image of the toner sprayed on slide glass using a Luzex image analyzer (FT, manufactured by Nireco Corporation) into the Luzex image analyzer through a video camera and performing image processing.

The projected area T of the toner particles is an arithmetic average value of the projected areas of all the toner particles taken into the Luzex image analyzer. Further, the projected area B of the particles B is an arithmetic average value of the projected areas of all the particles B taken into the Luzex image analyzer.

Production Method of Particles A and Particles B

The particles A and the particles B are produced by producing particles containing a perovskite-type compound and, as necessary, performing a hydrophobic treatment on the surface of the particles.

The method of producing particles containing a perovskite-type compound is not particularly limited, but from the viewpoint of controlling the particle diameter and the shape a wet production method is preferable.

Production of Particles Containing Perovskite-type Compound

The wet production method for particles containing a perovskite-type compound is, for example, a production method of reacting an alkaline aqueous solution with a mixed solution of a metal element source contained in the perovskite-type compound while adding the alkaline aqueous solution to the mixed solution and performing an acid treatment on the solution. In the present production method, the particle diameter of the particles containing a perovskite-type compound is controlled by the mixing ratio of the metal element source, the concentration of the metal element source at the initial stage of the reaction, and the temperature and the addition rate during the addition of the alkaline aqueous solution.

Here, in a case of the perovskite-type compound containing two kinds of metal elements, examples of the metal element source contained in the perovskite-type compound include a mineral acid deflocculated product containing one metal element, and a nitrate and a chloride containing the other metal element.

In a case where the particles containing a perovskite-type compound are strontium titanate particles, specific examples of the metal element source include a mineral acid deflocculated product of a hydrolyzate of a titanium compound (hereinafter, also referred to as a titanium source), strontium nitrate, and strontium chloride (hereinafter, also referred to as a strontium source).

Hereinafter, a method of producing strontium titanate particles will be described as an example of a method of producing particles containing a perovskite-type compound, but the present invention is not limited thereto.

The mixing ratio of the titanium oxide source and the strontium source is, for example, preferably 0.9 or greater and 1.4 or less, and more preferably 1.05 or greater and 1.20 or less in terms of the $SrO/TiO_2$ molar ratio. The titanium oxide source concentration at the initial stage of the reaction is, for example, preferably 0.05 mol/L or greater and 1.3 mol/L or less and more preferably 0.5 mol/L or greater and 1.0 mol/L or less as $TiO_2$.

For example, it is preferable that a dopant source is added to a mixed solution of the titanium oxide source and the strontium source. Examples of the dopant source include oxides of metals other than titanium and strontium. The metal oxide serving as a dopant source is added, for example, as a solution dissolved in nitric acid, hydrochloric acid, sulfuric acid, or the like. As the addition amount of the dopant source, for example, an amount set such that the amount of the metal serving as a dopant is 0.1 mol or greater and 10 mol or less with respect to 100 mol of strontium is preferable and an amount set such that the metal serving as a dopant is 0.5 mol or greater and 10 mol or less with respect to 100 mol of strontium is more preferable.

Further, the addition of the dopant source may be performed during the addition of an alkaline aqueous solution to the mixed solution of the titanium oxide source and the strontium source. During the addition, the oxide of the metal of the dopant source may be added as a solution dissolved in nitric acid, hydrochloric acid, or sulfuric acid.

As the alkaline aqueous solution, for example, a sodium hydroxide aqueous solution is preferable. For example, strontium titanate particles with a more satisfactory crystallinity are likely to be obtained as the temperature at which the alkaline aqueous solution is added increases, and in the present exemplary embodiment, the temperature is preferably in a range of 60° C. or higher and 100° C. or lower.

In regard to the addition rate of the alkaline aqueous solution, strontium titanate particles with a larger particle diameter are obtained as the addition rate decreases, and strontium titanate particles with a smaller particle diameter are obtained as the addition rate increases. The addition rate of the alkaline aqueous solution is, for example, 0.001 equivalent/h or greater and 1.2 equivalents/h or less and preferably 0.002 equivalents/h or greater and 1.1 equivalents/h or less with respect to the charged raw material.

After the addition of the alkaline aqueous solution, an acid treatment is performed for the purpose of removing the unreacted strontium source. In the acid treatment, for example, the pH of the reaction solution is adjusted to be in a range of 2.5 to 7.0 and more preferably in a range of 4.5 to 6.0 using hydrochloric acid.

After the acid treatment, the reaction solution is solid-liquid separated, and the solid content is subjected to a drying treatment, thereby obtaining strontium titanate particles.

By adjusting the conditions for the drying treatment on the solid content, the moisture content of the strontium titanate particles is controlled.

Further, in a case where the surface of each of the strontium titanate particles is subjected to a hydrophobic treatment, the moisture content may be controlled by adjusting the conditions for the drying treatment after the hydrophobic treatment.

Here, the drying conditions for controlling the moisture content are set, for example, such that the drying temperature is preferably 90° C. or higher and 300° C. or lower (for example, preferably 100° C. or higher and 150° C. or lower) and the drying time is 1 hour or longer and 15 hours or shorter (for example, preferably 5 hours or longer and 10 hours or shorter).

Here, in a case where aggregates using strontium titanate particles as primary particles are produced, for example, the moisture is removed by a filter press or suction filtration after generation of the strontium titanate particles, and the particles are allowed to stand at a temperature of 60° C. and dried. The particles are dried, crushed, and subjected to a classification step, thereby obtaining target aggregated particles.

Hydrophobic Treatment

The hydrophobic treatment on the surface of each of the strontium titanate particles is performed by, for example, preparing a treatment liquid obtained by mixing a hydrophobic treatment agent with a solvent, mixing the strontium titanate particles with the treatment liquid while stirring the solution, and continuously stirring the solution.

After the surface treatment, a drying treatment is performed for the purpose of removing the solvent of the treatment liquid.

Examples of the hydrophobic treatment agent are the same as described above.

As the solvent used for preparing the treatment liquid, for example, alcohols (such as methanol, ethanol, propanol, and butanol), hydrocarbons (such as benzene, toluene, normal hexane, and normal heptane), and the like are preferable.

The concentration of the hydrophobic treatment agent in the treatment liquid is, for example, preferably 1% by mass or greater and 50% by mass or less, more preferably 5% by mass or greater and 40% by mass or less, and still more preferably 10% by mass or greater and 30% by mass or less.

The amount of the hydrophobic treatment agent used for the hydrophobic treatment is, for example, preferably 1% by mass or greater and 50% by mass or less, more preferably 5% by mass or greater and 40% by mass or less, still more preferably 5% by mass or greater and 30% by mass or less, and particularly preferably 10% by mass or greater and 25% by mass or less with respect to the mass of the strontium titanate particles, as described above.

Other External Additives

The toner used in the present exemplary embodiment may contain particles other than the particles A and the particles B described above as other external additives.

Examples of other particles include inorganic particles other than strontium titanate particles.

Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surface of each of the inorganic particles serving as other external additives may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. The hydrophobic treatment agent may be used alone or in combination of two or more kinds thereof.

The amount of the hydrophobic treatment agent is, for example, preferably 1 part by mass or greater and 10 parts by mass or less with respect to 100 parts by mass of the inorganic particles.

Examples of other particles also include resin particles (resin particles such as polystyrene, polymethylmethacrylate, and a melamine resin) and a cleaning activator (such as fluorine-based polymer particles).

In a case where the toner contains other external additives, the content of the other external additives is, for example, preferably 1% by mass or greater and 30% by mass or less, more preferably 2% by mass or greater and 25% by mass or less, and still more preferably 3% by mass or less or greater and 20% by mass or less with respect to the total content of the external additives.

Method of Producing Toner

Next, a method for producing the toner according to the present exemplary embodiment will be described.

The toner according to the present exemplary embodiment can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The method of producing the toner particles is not particularly limited to such production methods, and a well-known production method is employed.

Among the examples, the toner particles may be obtained by, for example, the aggregation and coalescence method.

Specifically, for example, in a case where the toner particles are produced by the aggregation and coalescence method, the toner particles are produced by performing a step of preparing a resin particle dispersion liquid in which resin particles serving as a binder resin are dispersed (resin particle dispersion liquid preparation step), a step of allowing the resin particles (other particles as necessary) to be aggregated in the resin particle dispersion liquid (in the dispersion liquid which has been mixed with other particle dispersion liquids as necessary) to form aggregated particles (aggregated particle formation step), and a step of heating the aggregated particle dispersion liquid in which the aggregated particles are dispersed and fusing and coalescing the aggregated particles to form toner particles (fusion and coalescence step).

The details of each step will be described below.

In the following description, a method of obtaining toner particles containing a colorant and a release agent will be described, but the colorant and the release agent are used as necessary. It is needless to say that additives other than the colorant and the release agent may be used.

Resin Particle Dispersion Liquid Preparation Step

First, for example, a colorant particle dispersion liquid in which the colorant particles are dispersed and a release agent particle dispersion liquid in which the release agent particles are dispersed are prepared together with the resin particle dispersion liquid in which the resin particles serving as the binder resin are dispersed.

Here, the resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like, a cationic surfactant such as an amine salt type cationic surfactant and a quaternary ammonium salt type cationic surfactant, a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Further, depending on the kind of resin particles, for example, the resin particles may be dispersed in a resin particle dispersion liquid by a phase inversion emulsification method.

Further, the phase inversion emulsification method is a method of dissolving the resin to be dispersed in a hydrophobic organic solvent in which the resin is soluble, adding a base to an organic continuous phase (O phase) for neutralization, adding an aqueous medium (W phase) thereto, performing conversion of the resin (so-called phase inversion) from W/O to O/W to obtain a discontinuous phase, and dispersing the resin in the aqueous medium in the particle form.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less.

Further, the volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

In addition, similar to the resin particle dispersion liquid, for example, the colorant particle dispersion liquid and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

Aggregated Particle Formation Step

Next, the resin particle dispersion liquid, the colorant particle dispersion liquid, and the release agent particle dispersion liquid are mixed.

Further, the resin particles, the colorant particles, and the release agent particles are heteroaggregated in the mixed dispersion liquid to form aggregated particles including the resin particles, the colorant particles, and the release agent particles, which have a diameter close to the diameter of the target toner particles.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to the glass transition temperature of the resin particles (specifically, for example, a temperature higher than or equal to the glass transition temperature of the resin particles −30° C. and lower than or equal to the glass transition temperature thereof −10° C.) and allowing the particles dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant used as a dispersant to be added to the mixed dispersion liquid, an inorganic metal salt, and a divalent or higher valent metal complex. Particularly, in a case where a metal complex is used as the aggregating agent, the amount of the surfactant to be used is reduced, and the charging characteristics are improved.

An additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The addition amount of the chelating agent is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

Next, the aggregated particle dispersion liquid in which the aggregated particles are dispersed is heated to, for example, a temperature higher than or equal to the glass transition temperature of the resin particles (for example, a temperature higher than the glass transition temperature of the resin particles by 10° C. to 30° C.) and the aggregated particles are fused and coalesced, thereby forming toner particles.

The toner particles are obtained by performing the above-described steps.

Further, the toner particles may be produced by performing a step of obtaining the aggregated particle dispersion liquid in which the aggregated particles are dispersed, further mixing the aggregated particle dispersion liquid with the resin particle dispersion liquid in which the resin particles are dispersed, and allowing the resin particles to be aggregated such that the resin particles are further attached to the surface of each aggregated particle to form second aggregated particles and a step of heating the second aggregated particle dispersion liquid in which the second aggregated particles are dispersed and fusing and coalescing the second aggregated particle to form toner particles having a core-shell structure.

After completion of the fusion and coalescence step, toner particles in a dry state are obtained by performing a known cleaning step, a known solid-liquid separation step, and a known drying step on the toner particles formed in the solution.

From the viewpoint of the charging properties, for example, displacement cleaning may be sufficiently performed as the cleaning step using ion exchange water. The solid-liquid separation step is not particularly limited, but suction filtration, pressure filtration, or the like may be performed from the viewpoint of productivity. The method for the drying step is not particularly limited, but from the viewpoint of the productivity, freeze-drying, flush drying, fluidized drying, vibratory fluidized drying, or the like may be performed as the drying step.

The toner according to the present exemplary embodiment is produced by, for example, adding an external additive to the obtained toner particles in a dry state and mixing the external additive with the toner particles. The mixing may be performed, for example, using a V blender, a Henschel mixer, a Lödige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer obtained by mixing the toner and a carrier.

The carrier is not particularly limited, and examples thereof include known carriers. Examples of the carrier include a coated carrier obtained by coating the surface of a core material consisting of magnetic powder with a coating resin, a magnetic powder dispersion type carrier obtained by dispersing magnetic powder in a matrix resin so as to be blended, and a resin impregnation type carrier obtained by impregnating porous magnetic powder with a resin.

Further, each of the magnetic powder dispersion type carrier and the resin impregnation type carrier may be a carrier obtained by coating the surface of the particle constituting the carrier, serving as a core material, with a coating resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond or a product obtained by modifying the straight silicone resin, a fluororesin, polyester, polycarbonate, a phenol resin, and an epoxy resin.

Further, the coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

Here, the surface of a core material is coated with a coating resin by a method of coating the surface with a solution for forming a coating layer, which is obtained by dissolving a coating resin and various additives as necessary in an appropriate solvent. The solvent is not particularly limited, and may be selected in consideration of the coating resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

For example, it is preferable that the unevenness average interval Sm on the surface of the carrier is 0.5 μm or greater and 2.5 μm or less, and the arithmetic surface roughness Ra of the surface is 0.3 μm or greater and 1.2 μm or less.

By setting the unevenness average interval Sm of the carrier and the arithmetic surface roughness Ra of the surface to be in the above-described numerical ranges, an electrostatic charge image developing toner capable of suppressing occurrence of image defects due to the leakage of an electric charge from the electrostatic charge image developer can be obtained.

By setting the unevenness average interval Sm of the carrier and the arithmetic surface roughness Ra of the surface to be in the above-described numerical ranges, the carrier has a surface with appropriate unevenness. Therefore, the contact points between the carrier and the toner are likely to decrease within a range where the charging properties of the toner are not impaired. Accordingly, it is assumed that the electrostatic charge image developing toner that further suppress the occurrence of image defects due to the leakage of an electric charge from the electrostatic charge image developing toner is obtained.

From the viewpoint of further suppressing the occurrence of image defects due to the leakage of an electric charge from the electrostatic charge image developing toner, the unevenness average interval Sm on the surface of the carrier is, for example, more preferably 0.8 μm or greater and 1.5 μm or less and particularly preferably 0.8 μm or greater and 1.0 μm or less.

Further, from the viewpoint of further suppressing the occurrence of image defects due to the leakage of an electric charge from the electrostatic charge image developing toner, the arithmetic surface roughness Ra of the surface of the magnetic particles is, for example, preferably 0.5 μm or greater and 1.0 μm or less and particularly preferably 0.5 μm or greater and 0.6 μm or less.

In the present exemplary embodiment, the arithmetic surface roughness Ra and unevenness average interval Sm of the carrier are measured by the following method.

The unevenness average interval Sm and the arithmetic surface roughness Ra of the surface of the carrier are measured by a method of converting the surfaces of 50 carriers at a magnification of 3,000 times using an ultra-depth color 3D shape measurement microscope (VK-9500, manufactured by KEYENCE Corporation).

The unevenness average interval Sm is measured by acquiring the roughness curve from the three-dimensional shape of the observed surfaces of the carriers and acquiring the average value of the intervals of one ridge-valley cycle acquired from the intersection where the roughness curve intersects with the average line. The reference length for acquiring the Sm value is 10 μm, and the cut-off value is 0.08 mm.

The arithmetic surface roughness Ra is acquired by acquiring a roughness curve, and summing and averaging the measured value of the roughness curve and the absolute value of the deviation to the average value. The reference length for acquiring the Ra value is 10 μm, and the cut-off value is 0.08 mm.

The Sm value and the Ra value are measured in conformity with JIS B 0601 (1994 edition).

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

An image forming device and an image forming method according to the present exemplary embodiment will be described.

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

In a case of the intermediate transfer type device, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachable from the image forming device. For example, a process cartridge including a developing unit that accommodates the electrostatic charge image developer according to the present exemplary embodiment is preferably used as the process cartridge.

Hereinafter, an example of the image forming device according to the present exemplary embodiment will be described, but the present exemplary embodiment is not limited thereto. Further, main parts shown in the figures will be described, but description of other parts will not be provided.

FIG. 1 is a schematic configuration view showing an image forming device according to the present exemplary embodiment.

The image forming device shown in FIG. 1 includes first to fourth image forming units 10Y, 10M, 10C, and 10K having an electrophotographic system of outputting images of each color of yellow (Y), magenta (M), cyan (C), and black (K) based on color-separated image data. The image forming units (hereinafter, also simply referred to as "units") 10Y, 10M, 10C, and 10K are arranged in parallel at predetermined intervals in the horizontal direction. The units 10Y, 10M, 10C, and 10K may be process cartridges detachable from the image forming device.

Above the units 10Y, 10M, 10C, and 10K shown in the figure, an intermediate transfer belt 20, extends, as an intermediate transfer member, across each of the units. The intermediate transfer belt 20 is provided by winding around a drive roll 22 and a support roll 24 in contact with the inner surface of the intermediate transfer belt 20, which are disposed to be separated from each other in the lateral direction in the figure, and is designed to travel in a direction from the first unit 10Y to the fourth unit 10K. A force is applied to the support roll 24 in a direction away from the drive roll 22 by a spring or the like (not shown), and a tension is applied to the intermediate transfer belt 20 winding around the support roll 24 and the drive roll 22. An intermediate transfer member cleaning device 30 facing the drive roll 22 is provided on the image holding surface side of the intermediate transfer belt 20.

Each of four colors of yellow toner, magenta toner, cyan toner, and black toner stored in toner cartridges 8Y, 8M, 8C, and 8K is supplied to each of developing devices (an example of developing units) 4Y, 4M, 4C, and 4K of the units 10Y, 10M, 10C, and 10K.

Since the first to fourth units 10Y, 10M, 10C, and 10K have the same configuration, the first unit 10Y that forms a yellow image disposed on the upstream side in the traveling direction of the intermediate transfer belt will be described as a representative example. Further, the same portions as the portions in the first unit 10Y are denoted by the reference numerals with magenta (M), cyan (C), and black (K) in place of yellow (Y), and thus the description of the second to fourth units 10M, 10C, and 10K will not be repeated.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on a color-separated image signal to form an electrostatic charge image, a developing device (an example of a developing unit) 4Y that supplies the charged toner to the electrostatic charge image to develop the electrostatic charge image, a primary transfer roll 5Y (an example of the primary transfer unit) that transfers the developed toner image onto the intermediate transfer belt 20, and a photoreceptor cleaning device (an example of the cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, and 5K. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam 3Y, the specific resistance of the portion irradiated with the laser beam changes. Therefore, the laser beam 3Y is output to the surface of the charged photoreceptor 1Y through the exposure device 3 according to yellow image data sent from the control unit (not shown). The photosensitive layer on the surface of the photoreceptor 1Y is irradiated with laser beam 3Y, and thus an electrostatic charge image with a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam 3Y is decreased by the laser beam 3Y, the charged electric charge on the surface of the photoreceptor 1Y flows, and the electric charge in a portion that has not been irradiated with the laser beam 3Y remains.

The electrostatic charge image formed on the photoreceptor 1Y rotates to a predetermined development position according to the traveling of the photoreceptor 1Y. Further, the electrostatic charge image on the photoreceptor 1Y is visualized (developed image) at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has a charge having the same polarity (negative polarity) as the charged electric charge on the photoreceptor 1Y, and is held on a developer roll (an example of the developer holding member). Further, as the surface of the photoreceptor 1Y passes through the developing device 4Y, the yellow toner is electrostatically attached to the statically eliminated latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, +10 μA by the control unit (not shown) in the first unit 10Y.

On the other hand, the toner remaining on the photoreceptor 1Y is removed by the photoreceptor cleaning device 6Y and recovered.

The primary transfer bias applied to the primary transfer rolls 5M, 5C, and 5K of the second to fourth units 10M, 10C, and 10K is also controlled according to the first unit.

In this manner, the intermediate transfer belt 20 to which the yellow toner image is transferred by the first unit 10Y is sequentially transported through the second to fourth units 10M, 10C, and 10K, and the toner images of each color are superimposed and multiple-transferred.

The intermediate transfer belt 20, to which the toner images of four colors are multiple-transferred through the first to fourth units, reaches a secondary transfer unit formed of the intermediate transfer belt 20, a support roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the support roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

Thereafter, the recording paper P is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

Process Cartridge/Toner Cartridge

The process cartridge according to the present exemplary embodiment will be described.

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachably attached to the image forming device.

The configuration of the process cartridge according to the present exemplary embodiment is not limited thereto, and a configuration including a developing unit and, as necessary, at least one selected from other units such as an image holding member, a charging unit, an electrostatic charge image forming unit, or a transfer unit may be employed.

Hereinafter, an example of the process cartridge according to the present exemplary embodiment will be described, but the present invention is not limited thereto. Further, main parts shown in the figures will be described, but description of other parts will not be provided.

Figure 2:
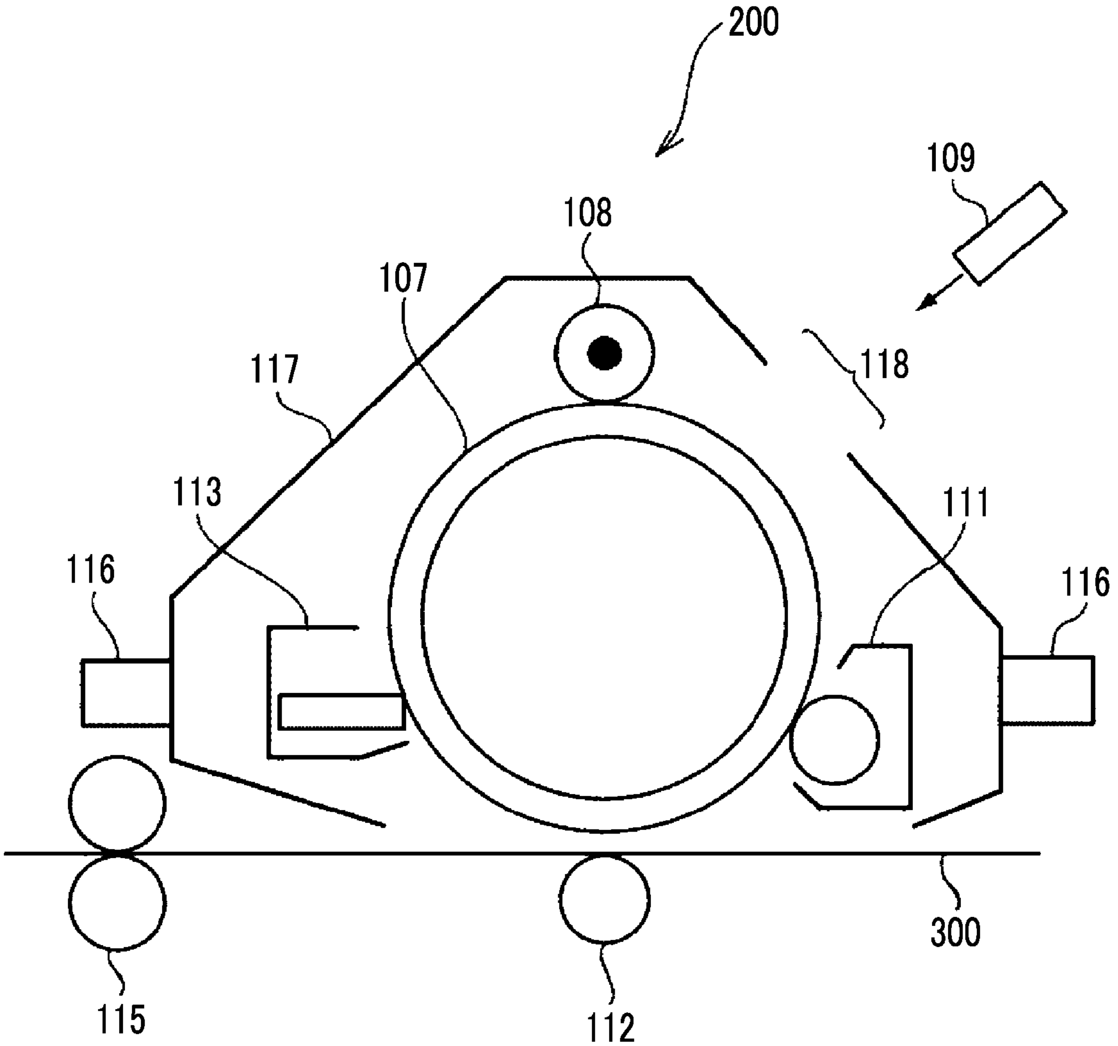
FIG. 2 is a schematic configuration view showing a process cartridge according to the present exemplary embodiment.

FIG. 2 is a schematic configuration view showing the process cartridge according to the present exemplary embodiment.

A process cartridge 200 shown in FIG. 2 is, for example, configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

The toner cartridge according to the present exemplary embodiment will be described below.

The toner cartridge according to the present exemplary embodiment of the present disclosure is a toner cartridge that includes a container accommodating the toner according to the present exemplary embodiment and is detachably attached to the image forming device. The toner cartridge includes a container accommodating a toner for replenishment which is to be supplied to the developing unit provided in the image forming device.

The image forming device shown in FIG. 1 is an image forming device having a configuration in which the toner cartridges 8Y, 8M, 8C, and 8K are detachable, and the developing devices 4Y, 4M, 4C, and 4K are respectively connected to the toner cartridge corresponding to each developing device (color) through a toner supply tube (not shown). Further, in a case where the amount of toner accommodated in the container of the toner cartridge is decreased, the toner cartridge is replaced.

EXAMPLES

Hereinafter, exemplary embodiments will be described based on examples, but the present invention is not limited to the examples. Further, in the following description, "parts" and "%" are on a mass basis unless otherwise specified.

Preparation of Toner Particles

Preparation of polyester resin particle dispersion liquid

Ethylene glycol [manufactured by FUJIFILM Wako Pure ChemicalCorporation]: 37 parts Neopentyl glycol [manufactured by FUJIFILM Wako Pure Chemical Corporation]: 65 parts 1,9-Nonanediol [manufactured by FUJIFILM Wako Pure Chemical Corporation]: 32 parts Terephthalic acid [manufactured by FUJIFILM Wako Pure Chemical Corporation]: 96 parts A flask is charged with the above-described monomers, heated to 200° C. for 1 hour, and 1.2 parts of dibuytltin oxide is added to the flask after confirmation that the mixture inside the reaction system is stirred. Further, the mixture is heated to 240° C. from the same temperature as described above for 6 hours while generated water is distilled off, and the dehydration condensation reaction is further continued at 240° C. for 4 hours, thereby obtaining a polyester resin A having an acid value of 9.4 mgKOH/g, a weight-average-molecular weight of 13,000, and a glass transition temperature of 62° C.

Next, the polyester resin A is transferred to CAVITRON CD1010 (manufactured by EUROTEC LIMITED) in a melted state. Dilute ammonia water having a concentration of 0.37% obtained by diluting reagent ammonia water with ion exchange water is added to an aqueous medium tank that has been separately prepared and transferred to the CAVITRON together with the polyester resin melt while being heated at 120° C. with a heat exchanger. The CAVITRON is operated under the conditions of a rotor rotation speed of 60 Hz and a pressure of 5 kg/cm$^2$, thereby obtaining a polyester resin particle dispersion liquid in which resin particles having a volume average particle diameter of 160 nm, a solid content of 30%, a glass transition temperature of 62° C., and a weight-average-molecular weight Mw of 13,000 are dispersed.

Preparation of Colorant Particle Dispersion Liquid

Cyan pigment [Pigment Blue 15:3, manufactured by Dainichiseika Color & Chemicals Mfg. Co., Ltd.]: 10 parts Anionic surfactant (NEOGEN SC, manufactured by DKS Co., Ltd.): 2 parts Ion exchange water: 80 parts The above-described components are mixed and dispersed for 1 hour with a high-pressure impact disperser ULTIMAIZER [HJP30006: manufactured by Sugino Machine, Ltd.], thereby obtaining a colorant particle dispersion liquid having a volume average particle diameter of 180 nm and a solid content of 20%.

Preparation of Release Agent Particle Dispersion Liquid

Paraffin wax (HNP-9, manufactured by Nippon Seiro Co., Ltd.): 50 parts

Anionic surfactant (NEOGEN SC, manufactured by DKS Co., Ltd.): 2 parts

Ion exchange water: 200 parts

The above-described components are heated to 120° C., sufficiently mixed and dispersed with ULTRA-TURRAX T50 (manufactured by IKA), and subjected to a dispersion treatment with a pressure discharge homogenizer, thereby obtaining a release agent particle dispersion liquid having a volume average particle diameter of 200 nm and a solid content of 20%.

Preparation of Toner Particles

Polyester resin particle dispersion liquid: 200 parts

Colorant particle dispersion liquid: 25 parts

Release agent particle dispersion liquid: 30 parts

Polyaluminum chloride: 0.4 parts

Ion exchange water: 100 parts

The above-described components are put into a stainless steel flask, mixed using ULTRA-TURRAX (manufactured by IKA), dispersed, and heated to 48° C. while the flask is stirred in a heating oil bath. The mixture is maintained at 48° C. for 30 minutes, 70 parts of the same polyester resin particle dispersion liquid as described above is added thereto.

Next, the pH in the system is adjusted to 8.0 using a sodium hydroxide aqueous solution having a concentration of 0.5 mol/L, the stainless steel flask is sealed, a seal of the stirring shaft is magnetically sealed, and the solution is heated to 90° C. while being continuously stirred and maintained for 3 hours. After completion of the reaction, the solution is cooled at a temperature lowering rate of 2° C./min, filtered, cleaned with ion exchange water, and subjected to solid-liquid separation by Nutsche-type suction filtration. The resultant is further redispersed using 3 L of ion exchange water at 30° C., and the mixture is stirred and cleaned at 300 rpm for 15 minutes. The cleaning operation is repeated 6 more times, and solid-liquid separation is performed using No. 5A filter paper by Nutsche-type suction filtration when the pH of the filtrate reaches 7.54 and the electrical conductivity reaches 6.5 ρS/cm. Next, vacuum-drying is continued for 12 hours, thereby obtaining toner particles.

The volume average particle diameter D50v of the toner particles is measured with a Coulter counter and found to be 5.8 μm.

Production of Particles A

Preparation of Particles (A1)

0.7 mol of metatitanic acid, which is a source of desulfurized and deflocculated titanium, is collected as $TiO_2$ and added to a reaction container. Next, 0.77 mol of a strontium chloride aqueous solution is added to the reaction container such that the molar ratio of $SrO/TiO_2$ reaches 1.1. Next, a solution obtained by dissolving lanthanum oxide in nitric acid is added to the reaction container in an amount of 2.5 mol of lanthanum with respect to 100 mol of strontium to prepare a mixed solution A. The initial concentration of $TiO_2$ in the mixed solution A is adjusted to 0.75 mol/L. Next, the mixed solution is stirred, heated to 90° C., and stirred, 153 mL of a 10 N (mol/L) sodium hydroxide aqueous solution is added to the mixed solution over 4 hours while the liquid temperature is maintained at 90° C., and the solution is further continuously stirred for 1 hour while the liquid temperature is maintained at 90° C. Next, the reaction solution is cooled to 40° C., hydrochloric acid is added to the reaction solution until the pH reaches 5.5, and the solution is stirred for 1 hour. Next, the precipitate is cleaned by repeating decantation and redispersion in water. Hydrochloric acid is added to the slurry containing the cleaned precipitate to adjust the pH to 6.5, and the solid content is separated by filtration and dried. An ethanol solution of i-butyltrimethoxysilane (i-BTMS) is added to the dried solid content in an amount of 20 parts of i-BTMS with respect to 100 parts of the solid content, and the solution is stirred for 1 hour. The solid content is separated by filtration, and the solid content is dried in air at 130° C. for 7 hours, thereby obtaining particles (A1).

Preparation of Particles (A2)

Particles (A2) are obtained in the same manner as in the preparation of the particles (A1) except that the solution obtained by dissolving lanthanum oxide in nitric acid is not added.

Preparation of Particles (A3)

Particles (A3) are obtained in the same manner as in the preparation of particles (A1) except that the solution obtained by dissolving lanthanum oxide in nitric acid is changed to a solution obtained by dissolving niobium oxide in nitric acid.

Preparation of Particles (A4)

Particles (A4) are obtained in the same manner as in the preparation of particles (A1) except that the initial concentration of $TiO_2$ in the mixed solution A is set to 0.75 mol/L, the temperature of the mixed solution is set to 88° C., the amount of sodium hydroxide is set to 170 ml, and the pH after cooling is set to 5.0.

Preparation of Particles (A5)

Particles (A5) are obtained in the same manner as in the preparation of particles (A1) except that the initial concentration of $TiO_2$ in the mixed solution A is set to 0.75 mol/L, the temperature of the mixed solution is set to 92° C., and the amount of sodium hydroxide is set to 143 ml.

Preparation of Particles (A6)

Particles (A6) are obtained in the same manner as in the preparation of particles (A1) except that the initial concentration of $TiO_2$ in the mixed solution A is set to 0.75 mol/L, the temperature of the mixed solution is set to 91° C., and the addition time for sodium hydroxide is set to 3 hours.

Production of Particles B

Preparation of Particles (B1)

0.7 mol of metatitanic acid, which is a source of desulfurized and deflocculated titanium, is collected as $TiO_2$ and added to a reaction container. Next, 0.77 mol of a strontium chloride aqueous solution is added to the reaction container such that the molar ratio of $SrO/TiO_2$ reaches 1.1. Next, a solution obtained by dissolving lanthanum oxide in nitric acid is added to the reaction container in an amount of 2.5 mol of lanthanum with respect to 100 mol of strontium to prepare a mixed solution A. The initial concentration of $TiO_2$ in the mixed solution A is adjusted to 0.75 mol/L. Next, the mixed solution is stirred, heated to 90° C., and stirred, 153 mL of a 10 N (mol/L) sodium hydroxide aqueous solution is added to the mixed solution over 4 hours while the liquid temperature is maintained at 90° C., and the solution is further continuously stirred for 3 hours while the liquid temperature is maintained at 90° C. Next, the reaction solution is cooled to 40° C., hydrochloric acid is added to the reaction solution until the pH reaches 5.5, and the solution is stirred for 1 hour. Next, the precipitate is cleaned by repeating decantation and redispersion in water. The slurry containing the cleaned precipitate is maintained at 85° C. for 1 hour and cooled to 40° C., and hydrochloric acid is added thereto to adjust the pH to 6.5. This slurry is pressed with a filter press to recover the solid content. Next, the solid content is dried at a temperature of 60° C. The dried solid matter is crushed by a Henschel mixer and classified by an air flow type classifier until the particle diameter thereof reaches the target particle diameter. An ethanol solution of i-butyltrimethoxysilane (i-BTMS) is added to the obtained classified product in an amount of 20 parts of i-BTMS with respect to 100 parts of solid content, and the solution is stirred for 1 hour. The solid content is separated by filtration, and the solid content is dried in the air at 130° C. for 7 hours, thereby obtaining particles (B1).

Preparation of Particles (B2)

Particles (B2) are obtained in the same manner as in the preparation of particles (B1) except that the liquid temperature after the addition of the sodium hydroxide aqueous solution is set to 94° C. and the classification is made until the target particle diameter is obtained.

Preparation of Particles (B3)

Particles (B3) are obtained in the same manner as in the preparation of particles (B1) except that the liquid temperature after the addition of the sodium hydroxide aqueous solution is set to 92° C. and the classification is made until the target particle diameter is obtained.

Preparation of Particles (B4)

Particles (B4) are obtained in the same manner as in the preparation of particles (B1) except that the liquid temperature after the addition of the sodium hydroxide aqueous solution is set to 95° C. and the classification is made until the target particle diameter is obtained.

Preparation of Particles (B5)

Particles (B5) are obtained in the same manner as in the preparation of particles (B1) except that the liquid temperature after the addition of the sodium hydroxide aqueous solution is set to 95° C. and the classification is made until the target particle diameter is obtained.

Preparation of Particles (B6)

Particles (B6) which are the primary particles are obtained in the same manner as in the preparation of particles (B1) except that the addition time for the sodium hydroxide aqueous solution is set to 8 hours and the solution is stirred for 6 hours by setting the liquid temperature after the addition of the sodium hydroxide aqueous solution to 95° C.

Preparation of Particles (B7)

Particles (B7) are obtained in the same manner as in the preparation of particles (B1) except that the addition amount of the sodium hydroxide aqueous solution is set to 170 ml, the addition time for the sodium hydroxide aqueous solution is set to 4.5 hours, and the solution is stirred for 4 hours by setting the liquid temperature after the addition of the sodium hydroxide aqueous solution to 92° C.

Preparation of Particles (B8)

Particles (B8) are obtained in the same manner as in the preparation of particles (B1) except that the addition amount of the sodium hydroxide aqueous solution is set to 163 ml, the addition time for the sodium hydroxide aqueous solution is set to 4.5 hours, and the solution is stirred for 4 hours by setting the liquid temperature after the addition of the sodium hydroxide aqueous solution to 92° C.

Preparation of Particles (B9)

Particles (B9) are obtained in the same manner as in the preparation of particles (B1) except that the addition time for the sodium hydroxide aqueous solution is set to 4.5 hours and the solution is stirred for 3.5 hours by setting the liquid temperature after the addition of the sodium hydroxide aqueous solution to 89° C.

Preparation of Particles (B10)

Particles (B10) are obtained in the same manner as in the preparation of particles (B1) except that the addition time for the sodium hydroxide aqueous solution is set to 4.5 hours and the solution is stirred for 3 hours by setting the liquid temperature after the addition of the sodium hydroxide aqueous solution to 90° C.

Preparation of Particles (B11)

Particles (B11) are obtained in the same manner as in the preparation of particles (B1) except that the addition amount of the sodium hydroxide aqueous solution is set to 133 ml, the addition time for the sodium hydroxide aqueous solution is set to 6 hours, and the solution is stirred for 4 hours by setting the liquid temperature after the addition of the sodium hydroxide aqueous solution to 90° C.

Preparation of Particles (B12)

Particles (B12) are obtained in the same manner as in the preparation of particles (B1) except that the solution obtained by dissolving lanthanum oxide in nitric acid is not added.

Preparation of Particles (B13)

Particles (B13) are obtained in the same manner as in the preparation of particles (B1) except that the solution obtained by dissolving lanthanum oxide in nitric acid is changed to a solution obtained by dissolving niobium oxide in nitric acid.

Preparation of Particles (B14)

Particles (B14) are obtained in the same manner as in the preparation of particles (B1) except that the addition amount of the sodium hydroxide aqueous solution is set to 143 ml and the addition time for the sodium hydroxide aqueous solution is set to 5 hours.

Preparation of Particles (B15)

Particles (B14) are obtained in the same manner as in the preparation of particles (B15) except that the liquid temperature after the addition of the sodium hydroxide aqueous solution is set to 89° C.

Preparation of Particles (B16)

Particles (B16) are obtained in the same manner as in the preparation of particles (B1) except that the addition amount of the sodium hydroxide aqueous solution is set to 138 ml, the addition time for the sodium hydroxide aqueous solution is set to 5 hours, and the solution is stirred for 3.5 hours by setting the liquid temperature after the addition of the sodium hydroxide aqueous solution to 90° C.

Preparation of Particles (B17)

Particles (B17) are obtained in the same manner as in the preparation of particles (B1) except that the addition amount of the sodium hydroxide aqueous solution is set to 163 ml, the addition time for the sodium hydroxide aqueous solution is set to 5 hours, and the solution is stirred for 3 hours by setting the liquid temperature after the addition of the sodium hydroxide aqueous solution to 92° C.

Preparation of Particles (B18)

Particles (B18) are obtained in the same manner as in the preparation of particles (B1) except that the addition amount of the sodium hydroxide aqueous solution is set to 163 ml, the addition time for the sodium hydroxide aqueous solution is set to 5.5 hours, and the solution is stirred for 3.5 hours by setting the liquid temperature after the addition of the sodium hydroxide aqueous solution to 93° C.

Preparation of Carrier a

Preparation of Coating Liquid

Cyclohexyl acrylate resin (weight-average-molecular weight of 50000): 36 parts by mass Carbon black VXC72 (manufactured by Cabot Corporation): 4 parts by mass Toluene: 250 parts by mass Isopropyl alcohol: 50 parts by mass The above-described components and the same amount of glass beads (particle diameter: 1 mm) as the amount of toluene are put into a sand mill (manufactured by Kansai Paint Co., Ltd.) and stirred at a rotation speed of 1,200 rpm for 30 minutes, thereby preparing a coating liquid having a solid content of 11% by mass.

Preparation of Magnetic Particles a 1,318 parts by mass of $Fe_2O_3$, 586 parts by mass of $Mn(OH)_2$, 96 parts by mass of $Mg(OH)_2$, 1 part by mass of $SrCO_3$, and 0.05 parts by mass of $SiO_2$ are mixed, polyvinyl alcohol, water, and zirconia beads having a media diameter of 1 mm are added thereto as dispersants, and the mixture is crushed and mixed by a sand mill.

Temporary Firing

Next, the zirconia beads are removed by filtration, and the mixture is dried, and a mixed oxide is obtained under the conditions of 20 rpm at 900° C. for 60 minutes with a rotary kiln.

Slurry Crushing

Next, polyvinyl alcohol and water are added thereto as dispersants, 6.6 parts by mass of polyvinyl alcohol is further added, and the mixture is crushed with a wet ball mill until the volume average particle diameter of the particles reaches 2.0 μm.

Granulation

Next, the particles are granulated with a spray dryer so that the dry particle diameter reaches 38 μm, and dried.

Main Firing

Further, the particles are fired in an electric furnace at a temperature of 1400° C. in an oxygen-nitrogen mixed atmosphere with an oxygen concentration of 1.0% for 5 hours.

Additional Step

The obtained particles are subjected to a crushing step and a classification step, heated in a rotary kiln at 15 rpm and 900° C. for 2 hours, and further subjected to a classification step, thereby obtaining magnetic particles a.

The unevenness average interval Sm of the surface of the magnetic particles a is 2.0 μm, the arithmetic surface roughness Ra of the surface is 1.0 μm, and the volume average particle diameter of the particles is 35 μm.

Formation of Resin Coating Layer 2,000 parts by mass of magnetic particles 1 are added to a vacuum degassing type kneader, 560 parts by mass of a coating liquid 1 is further added thereto, the pressure is reduced to 1 atm-200 mmHg at 60° C. while the mixture is stirred, and the mixture is mixed for 15 minutes, heated, decompressed, stirred and dried at 94° C./1 atm-720 mmHg for 30 minutes, thereby obtaining resin-coated particles. Next, the particles are sieved with a sieving net having a mesh opening of 75 μm, thereby obtaining a carrier a.

The coating amount of the carrier a with respect to the magnetic particles of the coating resin layer is 2.8% by mass.

The unevenness average interval Sm of the surface of the carrier a is 1.5 μm, the arithmetic surface roughness Ra of the surface is 0.8 μm, and the volume average particle diameter of the particles is μm.

Preparation of Carrier b

A carrier b is obtained in the same manner as in the preparation of the carrier a except that the addition amount of $SiO_2$ is set to 0.02 parts by mass, the slurry is crushed until the volume average particle diameter reaches 1.0 μm, the main firing is performed under a condition of 1420° C., the oxygen concentration is set to 0.8%, and the coating amount on the magnetic particles is set to 3.5% by mass.

Preparation of Carrier c

A carrier c is obtained in the same manner as in the preparation of the carrier a except that the addition amount of $SiO_2$ is set to 0.04 parts by mass, the slurry is crushed until the volume average particle diameter reaches 1.5 μm, the main firing is performed under a condition of 1410° C., the oxygen concentration is set to 0.9%, and the coating amount on the magnetic particles is set to 3.0% by mass.

Preparation of Carrier d

A carrier d is obtained in the same manner as in the preparation of the carrier a except that the addition amount of $SiO_2$ is set to 0.1 parts by mass, the slurry is crushed until the volume average particle diameter reaches 2.2 μm, the main firing is performed under a condition of 1380° C., the oxygen concentration is set to 1.1%, and the coating amount on the magnetic particles is set to 2.5% by mass.

Preparation of Carrier e

A carrier e is obtained in the same manner as in the preparation of the carrier a except that the addition amount of $SiO_2$ is set to 0.15 parts by mass, the slurry is crushed until the volume average particle diameter reaches 2.2 μm, the main firing is performed under a condition of 1370° C., the oxygen concentration is set to 1.1%, and the coating amount on the magnetic particles is set to 3.2% by mass.

Preparation of Carrier f

A carrier f is obtained in the same manner as in the preparation of the carrier a except that the addition amount of $SiO_2$ is set to 0.04 parts by mass, the slurry is crushed until the volume average particle diameter reaches 1.8 μm, the main firing is performed under a condition of 1420° C., the oxygen concentration is set to 0.5%, and the coating amount on the magnetic particles is set to 3.5% by mass.

Preparation of Carrier g

A carrier g is obtained in the same manner as in the preparation of the carrier a except that the addition amount of $SiO_2$ is set to 0.05 parts by mass, the slurry is crushed until the volume average particle diameter reaches 1.8 μm, the main firing is performed under a condition of 1410° C., the oxygen concentration is set to 0.5%, and the coating amount on the magnetic particles is set to 3.3% by mass.

Preparation of Carrier h

A carrier h is obtained in the same manner as in the preparation of the carrier a except that the addition amount of $SiO_2$ is set to 0.1 parts by mass, the slurry is crushed until the volume average particle diameter reaches 2.2 μm, the main firing is performed under a condition of 1390° C., the oxygen concentration is set to 1.2%, and the coating amount on the magnetic particles is set to 2.8% by mass.

Preparation of Carrier i

A carrier i is obtained in the same manner as in the preparation of the carrier an except that the addition amount of $SiO_2$ is set to 0.12 parts by mass, the slurry is crushed until the volume average particle diameter reaches 2.2 μm, the main firing is performed under a condition of 1380° C., the oxygen concentration is set to 1.3%, and the coating amount on the magnetic particles is set to 2.6% by mass.

Preparation of Toner and Developer: Example 1

0.5 parts of the strontium titanate particles (A1) as an external additive, 0.6 parts of the aggregates (B1), and 0.7 parts of hydrophobic silica R972 (manufactured by Nippon Aerosil Co., Ltd.) as another external additive are added to 100 parts of toner particles and mixed using a Henschel mixer at a stirring peripheral speed of 30 m/sec for 15 minutes, thereby obtaining a toner.

Further, each of the obtained toners and the carrier (a) are added to a V-blender at a ratio (toner:carrier) of 8:92 (mass ratio) and stirred for 20 minutes, thereby obtaining a developer.

Examples 2 to 35 and Comparative Examples 1 to 8

Each toner and each developer are obtained in the same manner as in Example 1 except that the kinds and the addition amounts of the external additives (particle A, particles B, and other external additives) added during preparation of the toner, and the kind of carrier added during preparation of the developer are changed as listed in Table 1.

Image Evaluation

The developing device in "DCC400" (manufactured by Fuji Xerox Co., Ltd.) in which the potential difference between the photoreceptor and the developing device is maximized is charged with the obtained developer. 100 sheets of white paper are output under the conditions of 15° C. and 35% RH, a solid image having a size of 50 mm×50 mm and an image density of 100% is printed, and the obtained printed material is defined as A.

Next, the developing device is taken out from the DCC400, and the auger and the magnetic roll are driven in that state for 30 minutes. Thereafter, the developing device is returned to DCC400 again, a solid image having a size of 50 mm×50 mm and an image density of 100% is printed, and the obtained printed material is defined as B.

The obtained printed material A and printed material B are visually confirmed, and image evaluation is performed based on the following evaluation standards.

A (○○): Whitened spots or scattering of the toner are not found in the image, satisfactory B (○): Whitened spots or scattering of the toner are not found in the image, but the image density is low C (Δ): Whitened spots or scattering of the toner is found in the image D (x): Whitened spots and scattering of the toner are found in the image E (xx): Whitened spots and scattering of the toner are particularly largely found in the image

TABLE 1

| | Particles A | | | | | | Particles B | | | | | |
|---|---|---|---|---|---|---|---|---|---|---|---|---|
| | | Type of particles | Type of dopant | Equiv-alent circle diameter | Average circu-larity | Cumula-tive 84% circu-larity | | Type of particles | State of particles | % by number of specific aggregates (with respect to aggregates) | % by number of aggregates (with respect to particles B) | Equiv-alent circle diameter |
| Example 1 | A1 | Strontium titanate particles | Lanthanum | 40 | 0.95 | 0.94 | B1 | Strontium titanate particles | Aggregates | 88 | 92 | 2 |
| Comparative Example 1 | — | — | — | — | — | — | — | — | — | — | — | — |
| Comparative Example 2 | A1 | Strontium titanate particles | Lanthanum | 40 | 0.9 | 0.94 | — | — | — | — | — | — |
| Comparative Example 3 | — | — | — | — | — | — | — | — | — | — | — | — |
| Comparative Example 4 | A1 | Strontium titanate particles | Lanthanum | 40 | 0.9 | 0.94 | — | — | — | — | — | — |
| Comparative Example 5 | A1 | Strontium titanate particles | Lanthanum | 40 | 0.9 | 0.94 | B2 | Strontium titanate particles | Aggregates | 40 | 43 | 0.9 |
| Example 2 | A1 | Strontium titanate particles | Lanthanum | 40 | 0.9 | 0.94 | B3 | Strontium titanate particles | Aggregates | 60 | 62 | 1.0 |
| Example 3 | A1 | Strontium titanate particles | Lanthanum | 40 | 0.9 | 0.94 | B4 | Strontium titanate particles | Aggregates | 90 | 93 | 3.0 |
| Comparative Example 6 | A1 | Strontium titanate particles | Lanthanum | 40 | 0.9 | 0.94 | B5 | Strontium titanate particles | Aggregates | 90 | 94 | 3.1 |
| Comparative Example 7 | A1 | Strontium titanate particles | Lanthanum | 40 | 0.9 | 0.94 | B1 | Strontium titanate particles | Aggregates | 88 | 92 | 2 |
| Example 4 | A1 | Strontium titanate particles | Lanthanum | 40 | 0.9 | 0.94 | B1 | Strontium titanate particles | Aggregates | 88 | 92 | 2 |
| Example 5 | A1 | Strontium Titanate particles | Lanthanum | 40 | 0.9 | 0.94 | B1 | Strontium titanate particles | Aggregates | 88 | 92 | 2 |
| Comparative Example 8 | A1 | Strontium titanate particles | Lanthanum | 40 | 0.9 | 0.94 | B1 | Strontium titanate particles | Aggregates | 88 | 92 | 2 |
| Example 6 | A1 | Strontium titanate particles | Lanthanum | 40 | 0.9 | 0.94 | B6 | Strontium titanate particles | Primary particles | — | — | 2 |
| Example 7 | A1 | Strontium titanate particles | Lanthanum | 40 | 0.9 | 0.94 | B7 | Strontium titanate particles | Aggregates | 79 | 82 | 2 |
| Example 8 | A1 | Strontium titanate particles | Lanthanum | 40 | 0.9 | 0.94 | B8 | Strontium titanate particles | Aggregates | 80 | 83 | 2.2 |
| Example 9 | A1 | Strontium titanate particles | Lanthanum | 40 | 0.9 | 0.94 | B9 | Strontium titanate particles | Aggregates | 84 | 86 | 2 |
| Example 10 | A1 | Strontium titanate particles | Lanthanum | 40 | 0.9 | 0.94 | B10 | Strontium titanate particles | Aggregates | 85 | 87 | 2 |
| Example 11 | A1 | Strontium titanate particles | Lanthanum | 40 | 0.9 | 0.94 | B11 | Strontium titanate particles | Aggregates | 100 | 100 | 3.0 |
| Example 12 | A2 | Strontium titanate particles | None | 40 | 0.9 | 0.94 | B1 | Strontium titanate particles | Aggregates | 88 | 92 | 2 |
| Example 13 | A1 | Strontium Titanate particles | Lanthanum | 40 | 0.9 | 0.94 | B12 | Strontium titanate particles | Aggregates | 88 | 92 | 2 |
| Example 14 | A3 | Strontium Titanate particles | Lanthanum | 40 | 0.9 | 0.94 | B1 | Strontium titanate particles | Aggregates | 88 | 92 | 2 |
| Example 15 | A1 | Strontium Titanate particles | Lanthanum | 40 | 0.9 | 0.94 | B13 | Strontium titanate particles | Aggregates | 88 | 92 | 2 |

TABLE 1-continued

| | | | | | | | | | | | | |
|---|---|---|---|---|---|---|---|---|---|---|---|---|
| Example 16 | A4 | Strontium Titanate particles | Lanthanum | 40 | 0.81 | 0.88 | B1 | Strontium titanate particles | Aggregates | 88 | 92 | 2 |
| Example 17 | A5 | Strontium Titanate particles | Lanthanum | 40 | 0.95 | 0.96 | B1 | Strontium titanate particles | Aggregates | 88 | 92 | 2 |
| Example 18 | A6 | Strontium Titanate particles | Lanthanum | 40 | 0.9 | 0.92 | B1 | Strontium titanate particles | Aggregates | 88 | 92 | 2 |
| Example 19 | A1 | Strontium Titanate particles | Lanthanum | 40 | 0.9 | 0.94 | B14 | Strontium titanate particles | Aggregates | 90 | 92 | 2 |
| Example 20 | A1 | Strontium Titanate particles | Lanthanum | 40 | 0.9 | 0.94 | B15 | Strontium titanate particles | Aggregates | 90 | 92 | 2 |
| Example 21 | A1 | Strontium Titanate particles | Lanthanum | 40 | 0.9 | 0.94 | B16 | Strontium titanate particles | Aggregates | 90 | 92 | 2 |
| Example 22 | A1 | Strontium Titanate particles | Lanthanum | 40 | 0.9 | 0.94 | B17 | Strontium titanate particles | Aggregates | 90 | 92 | 2 |
| Example 23 | A1 | Strontium Titanate particles | Lanthanum | 40 | 0.9 | 0.94 | B18 | Strontium titanate particles | Aggregates | 90 | 92 | 2 |
| Example 24 | A1 | Strontium Titanate particles | Lanthanum | 40 | 0.9 | 0.94 | B1 | Strontium Titanate particles | Aggregates | 88 | 92 | 2 |
| Example 25 | A1 | Strontium Titanate particles | Lanthanum | 40 | 0.9 | 0.94 | B1 | Strontium Titanate particles | Aggregates | 88 | 92 | 2 |
| Example 26 | A1 | Strontium Titanate particles | Lanthanum | 40 | 0.9 | 0.94 | B1 | Strontium Titanate particles | Aggregates | 88 | 92 | 2 |
| Example 27 | A1 | Strontium Titanate particles | Lanthanum | 40 | 0.9 | 0.94 | B1 | Strontium Titanate particles | Aggregates | 88 | 92 | 2 |
| Example 28 | A1 | Strontium Titanate particles | Lanthanum | 40 | 0.9 | 0.94 | B1 | Strontium Titanate particles | Aggregates | 88 | 92 | 2 |
| Example 29 | A1 | Strontium Titanate particles | Lanthanum | 40 | 0.9 | 0.94 | B1 | Strontium titanate particles | Aggregates | 88 | 92 | 2 |
| Example 30 | A1 | Strontium Titanate particles | Lanthanum | 40 | 0.9 | 0.94 | B1 | Strontium titanate particles | Aggregates | 88 | 92 | 2 |
| Example 31 | A1 | Strontium Titanate particles | Lanthanum | 40 | 0.9 | 0.94 | B1 | Strontium titanate particles | Aggregates | 88 | 92 | 2 |
| Example 32 | A1 | Strontium Titanate particles | Lanthanum | 40 | 0.9 | 0.94 | B1 | Strontium titanate particles | Aggregates | 88 | 92 | 2 |
| Example 33 | A1 | Strontium Titanate particles | Lanthanum | 40 | 0.9 | 0.94 | B1 | Strontium titanate particles | Aggregates | 88 | 92 | 2 |
| Example 34 | A1 | Strontium Titanate particles | Lanthanum | 40 | 0.9 | 0.94 | B1 | Strontium titanate particles | Aggregates | 88 | 92 | 2 |
| Example 35 | A1 | Strontium Titanate particles | Lanthanum | 40 | 0.9 | 0.94 | B1 | Strontium titanate particles | Aggregates | 88 | 92 | 2 |

| | Particles B | | | | | Other external additives | | Toner Ratio (projected area B/ projected area T) | Developer | | | Image evaluation | |
|---|---|---|---|---|---|---|---|---|---|---|---|---|---|
| | Average circularity | Cumulative 84% circularity | % number (with respect to toner particles) | Type of dopant | Addition amount | Type | Addition amount | (value of $\times 10^{-4}$ | Type of carrier | Sm of carrier | Ra of carrier | Printed material A | Printed material B |
| Example 1 | 0.9 | 0.93 | 2 | Lanthanum | 0.6 | Silica particles | 0.7 | 10 | a | 1.5 | 0.8 | A(○○) | A(○○) |
| Comparative Example 1 | — | — | — | — | — | Silica particles | 0.7 | — | a | 1.5 | 0.8 | D(x) | E(xx) |
| Comparative Example 2 | — | — | — | — | — | Silica particles | 0.7 | — | a | 1.5 | 0.8 | D(x) | E(xx) |

TABLE 1-continued

| | | | | | | | | | | | | | |
|---|---|---|---|---|---|---|---|---|---|---|---|---|---|
| Comparative Example 3 | — | — | — | — | — | Silica particles/ titanate oxide particles | 0.7 | — | a | 1.5 | 0.8 | D(x) | E(xx) |
| Comparative Example 4 | — | — | — | — | — | Coarse silica particles | 0.7 | 8 | a | 1.5 | 0.8 | D(x) | D(x) |
| Comparative Example 5 | 0.94 | 0.95 | 2 | Lanthanum | 0.8 | Silica particles | 0.7 | 16 | a | 1.5 | 0.8 | D(x)) | D(x) |
| Example 2 | 0.9 | 0.9 | 2 | Lanthanum | 1 | Silica particles | 0.7 | 20 | a | 1.5 | 0.8 | C(Δ) | C(Δ) |
| Example 3 | 0.9 | 0.9 | 2 | Lanthanum | 0.5 | Silica particles | 0.7 | 9 | a | 1.5 | 0.8 | C(Δ) | C(Δ) |
| Comparative Example 6 | 0.88 | 0.9 | 2 | Lanthanum | 0.5 | Silica particles | 0.7 | 9 | a | 1.5 | 0.8 | D(x) | D(x) |
| Comparative Example 7 | 0.9 | 0.93 | 0.2 | Lanthanum | 0.6 | Silica particles | 0.5 | 6 | a | 1.5 | 0.8 | D(x) | D(x) |
| Example 4 | 0.9 | 0.93 | 0.3 | Lanthanum | 0.6 | Silica particles | 0.4 | 6 | a | 1.5 | 0.8 | C(Δ) | C(Δ) |
| Example 5 | 0.9 | 0.93 | 3.5 | Lanthanum | 0.6 | Silica particles | 1.2 | 21 | a | 1.5 | 0.8 | C(Δ) | C(Δ) |
| Comparative Example 8 | 0.9 | 0.93 | 3.6 | Lanthanum | 0.6 | Silica particles | 1.3 | 22 | a | 1.5 | 0.8 | D(x) | D(x) |
| Example 6 | 0.9 | 0.91 | 2 | Lanthanum | 0.6 | Silica particles | 0.8 | 10 | a | 1.5 | 0.8 | B(○) | C(Δ) |
| Example 7 | 0.89 | 0.9 | 2 | Lanthanum | 0.6 | Silica particles | 0.7 | 10 | a | 1.5 | 0.8 | B(○) | C(Δ) |
| Example 8 | 0.88 | 0.9 | 2 | Lanthanum | 0.6 | Silica particles | 0.7 | 9 | a | 1.5 | 0.8 | B(○) | B(○) |
| Example 9 | 0.88 | 0.9 | 2 | Lanthanum | 0.6 | Silica particles | 0.7 | 10 | a | 1.5 | 0.8 | B(○) | B(○) |
| Example 10 | 0.88 | 0.9 | 2 | Lanthanum | 0.6 | Silica particles | 0.7 | 10 | a | 1.5 | 0.8 | A(○○) | B(○) |
| Example 11 | 0.87 | 0.88 | 2 | Lanthanum | 0.6 | Silica particles | 0.6 | 8 | a | 1.5 | 0.8 | B(○) | B(○) |
| Example 12 | 0.9 | 0.93 | 2 | Lanthanum | 0.6 | Silica particles | 0.7 | 8 | a | 1.5 | 0.8 | B(○) | C(Δ) |
| Example 13 | 0.9 | 0.93 | 2 | None | 0.6 | Silica particles | 0.7 | 10 | a | 1.5 | 0.8 | B(○) | B(○) |
| Example 14 | 0.9 | 0.93 | 2 | Lanthanum | 0.6 | Silica particles | 0.7 | 8 | a | 1.5 | 0.8 | B(○) | B(○) |
| Example 15 | 0.9 | 0.93 | 2 | Niobium | 0.6 | Silica particles | 0.7 | 10 | a | 1.5 | 0.8 | A(○○) | B(○) |
| Example 16 | 0.9 | 0.93 | 2 | Lanthanum | 0.6 | Silica particles | 0.7 | 8 | a | 1.5 | 0.8 | C(Δ) | C(Δ) |
| Example 17 | 0.9 | 0.93 | 2 | Lanthanum | 0.6 | Silica particles | 0.7 | 8 | a | 1.5 | 0.8 | B(○) | C(Δ) |
| Example 18 | 0.9 | 0.93 | 2 | Lanthanum | 0.6 | Silica particles | 0.7 | 8 | a | 1.5 | 0.8 | B(○) | C(Δ) |
| Example 19 | 0.81 | 0.82 | 2 | Lanthanum | 0.6 | Silica particles | 0.7 | 11 | a | 1.5 | 0.8 | B(○) | C(Δ) |
| Example 20 | 0.82 | 0.83 | 2 | Lanthanum | 0.6 | Silica particles | 0.7 | 11 | a | 1.5 | 0.8 | B(○) | C(Δ) |
| Example 21 | 0.94 | 0.95 | 2 | Lanthanum | 0.6 | Silica particles | 0.7 | 10 | a | 1.5 | 0.8 | B(○) | C(Δ) |
| Example 22 | 0.95 | 0.96 | 2 | Lanthanum | 0.6 | Silica particles | 0.7 | 10 | a | 1.5 | 0.8 | B(○) | C(Δ) |
| Example 23 | 0.9 | 0.92 | 2 | Lanthanum | 0.6 | Silica particles | 0.7 | 10 | a | 1.5 | 0.8 | B(○) | C(Δ) |
| Example 24 | 0.9 | 0.93 | 2 | Lanthanum | 0.6 | Silica particles | 0.7 | 0.5 | a | 1.5 | 0.8 | B(○) | C(Δ) |
| Example 25 | 0.9 | 0.93 | 2 | Lanthanum | 0.6 | Silica particles | 0.7 | 0.4 | a | 1.5 | 0.8 | B(○) | C(Δ) |
| Example 26 | 0.9 | 0.93 | 2 | Lanthanum | 0.6 | Silica particles | 0.7 | 20 | a | 1.5 | 0,8 | B(○) | C(Δ) |
| Example 27 | 0.9 | 0.93 | 2 | Lanthanum | 0.6 | Silica particles | 0.7 | 22 | a | 1.5 | 0.8 | B(○) | C(Δ) |
| Example 28 | 0.9 | 0.93 | 2 | Lanthanum | 0.6 | Silica particles | 0.7 | 10 | b | 0.4 | 0.5 | B(○) | B(○) |
| Example 29 | 0.9 | 0.93 | 2 | Lanthanum | 0.6 | Silica particles | 0.7 | 10 | C | 0.5 | 0.6 | A(○○) | B(○) |
| Example 30 | 0.9 | 0.93 | 2 | Lanthanum | 0.6 | Silica particles | 0.7 | 10 | d | 2.5 | 1 | A(○○) | B(○) |
| Example 31 | 0.9 | 0.93 | 2 | Lanthanum | 0.6 | Silica particles | 0.7 | 10 | e | 2.6 | 1.2 | B(○) | B(○) |
| Example 32 | 0.9 | 0.93 | 2 | Lanthanum | 0.6 | Silica particles | 0.7 | 10 | f | 0.5 | 0.2 | B(○) | B(○) |
| Example 33 | 0.9 | 0.93 | 2 | Lanthanum | 0.6 | Silica particles | 0.7 | 10 | g | 0.5 | 0.3 | A(○○) | B(○) |

TABLE 1-continued

| | | | | | | | | | | | | | |
|---|---|---|---|---|---|---|---|---|---|---|---|---|---|
| Example 34 | 0.9 | 0.93 | 2 | Lanthanum | 0.6 | Silica particles | 0.7 | 10 | h | 2.1 | 1.2 | A(○○) | B(○) |
| Example 35 | 0.9 | 0.93 | 2 | Lanthanum | 0.6 | Silica particles | 0.7 | 10 | i | 2.2 | 1.3 | B(○) | B(○) |

The unit of the equivalent circle diameter of the particles A listed in the table is "nm".

The unit of the equivalent circle diameter of the particle B listed in the tables is "μm".

The abbreviations in the table are as follows.

Particle B

% by number of specific aggregates (with respect to aggregates): % by number of aggregates including 10 or more primary particles with respect to entirety of aggregates % by number of aggregates (with respect to particle B): % by number of aggregates with respect to entirety of particles B % by number (with respect to toner particles): % by number of particles B with respect to entirety of toner particles Other External Additives Silica particles: Hydrophobic silica R972 (manufactured by Nippon Aerosil Co., Ltd.)

Titanium oxide particles: JMT2000 (manufactured by TAYCA Corporation, volume average particle diameter of 20 nm)

Coarse silica particles: wet silica, 120 nm

As shown in the results described above, it is found that in the toners of the examples, whitened spots and scattering of the toners, which are image defects due to the leakage of an electric charge from the electrostatic charge image developing toner, are suppressed in the image as compared with the toners of the comparative examples.

Therefore, as shown in the results described above, it is found that the toner of the present example can suppress occurrence of image defects due to the leakage of an electric charge from the electrostatic charge image developing toner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles; and an external additive that contains particles A containing a perovskite-type compound and having an equivalent circle diameter of 15 nm or greater and 90 nm or less and particles B containing a perovskite-type compound and having an equivalent circle diameter of 1.0 μm or greater and 3.0 μm or less, wherein the particles B occupy 0.3% by number or greater and 3.5% by number or less of an entirety of the toner particles, the particles B are aggregates including a plurality of primary particles, and the aggregates including 10 or more primary particles occupy 80% by number or greater of an entirety of the aggregates.

2. The electrostatic charge image developing toner according to claim 1, wherein the aggregates including 10 or more primary particles occupy 85% by number or greater and 100% by number or less of the entirety of the aggregates.

3. The electrostatic charge image developing toner according to claim 1, wherein at least one of the particles A or the particles B are strontium titanate particles containing a dopant.

4. The electrostatic charge image developing toner according to claim 3, wherein the dopant is a lanthanum.

5. The electrostatic charge image developing toner according to claim 1, wherein at least one of the particles A or the particles B has an average circularity of 0.82 or greater and 0.94 or less and a cumulative 84% circularity of greater than 0.92.

6. The electrostatic charge image developing toner according to claim 1, wherein a ratio (projected area B/projected area T) of a projected area B of the particles B to a projected area T of the toner particles is $0.5\times10^{-4}$ or greater and $20.0\times10^{-4}$ or less.

7. An electrostatic charge image developer comprising:

the electrostatic charge image developing toner according to claim 1.

8. The electrostatic charge image developer according to claim 7, further comprising:

a carrier.

9. The electrostatic charge image developer according to claim 8, wherein an unevenness average interval Sm of a surface of the carrier is 0.5 μm or greater and 2.5 μm or less, and an arithmetic surface roughness Ra of the surface is 0.3 μm or greater and 1.2 μm or less.

10. A toner cartridge comprising:

a container that accommodates the electrostatic charge image developing toner according to claim 1, wherein the toner cartridge is detachable from an image forming device.

* * * * *